Figure 1:
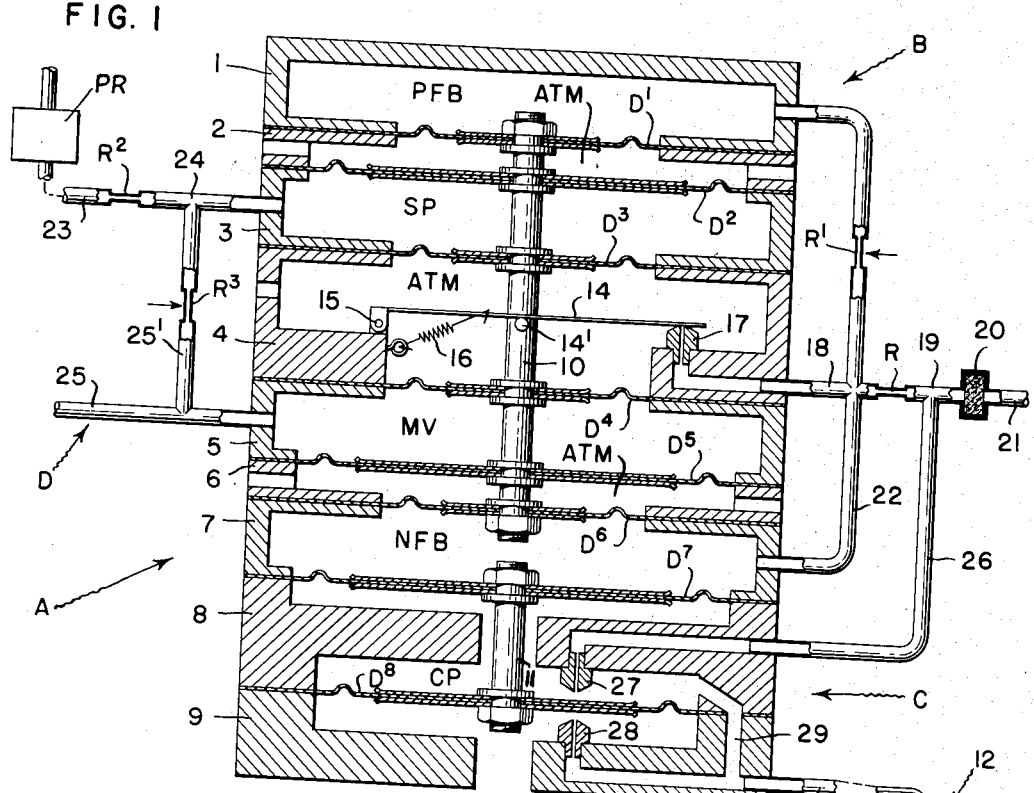

July 5, 1955 E. C. GROGAN 2,712,321
CONTROL APPARATUS
Filed April 17, 1951

*INVENTOR.*
EDWARD C. GROGAN
BY Arthur H. Swanson
ATTORNEY.

United States Patent Office 2,712,321
Patented July 5, 1955

2,712,321
CONTROL APPARATUS

Edward C. Grogan, Philadelphia, Pa., assignor to Minneapolis-Honeywell Regulator Company, Minneapolis, Minn., a corporation of Delaware Application April 17, 1951, Serial No. 221,501

2 Claims. (Cl. 137—86)

The general object of the present invention is to provide a novel elastic fluid, pressure actuated, controller, ordinarily an air controller, which is of the force balance type and characterized by its novel means for effecting proportional control.

In the preferred form illustrated, my improved controller is adapted to provide proportional plus reset control, and comprises separate set-point, measured variable, negative feed-back, and positive feed-back pressure chambers. Said chambers have flexible walls relatively arranged and connected to provide a control force which is a resultant of the pressures in said chambers.

A more specific object of the invention is to provide a controller including novel automatic means for narrowing the throttling range to provide prompt and substantial correction for a relatively abrupt and substantial change in the value of the measured variable, and for widening the throttling range to provide more gradual corrections for more gradual changes in the value of the last mentioned quantity.

Another specific object of the invention is to provide an improved means for effecting a proportional band adjustment comprising a novel pressure dividing circuit interposed between and connecting the set-point and measured variable pressure chambers. Said circuit includes a first conduit connecting a source of set-point pressure to the set-point chamber through a first flow restriction, a second conduit through which a pressure proportional to the measured variable is transmitted to the measured variable pressure chamber, and a third conduit having a regulable flow restriction and connecting said second conduit to the set-point chamber. In the preferred form of the invention, the final control pressure, or output pressure of the controller, is directly dependent on the differential of the negative feed-back pressure and the constant pressure at which air or other actuating fluid under pressure is supplied to the controller.

Another object of the invention is to provide a pilot valve or relay mechanism adapted for use in or in association with an air controller, and characterized by the simple and effective provisions adapting the mechanism for use as a highly sensitive gain relay, or pressure multiplier.

A still more specific object of the invention is to provide a simpler and less expensive controller of the stack assembly type for obtaining major objects and advantages obtained with the controller disclosed in my prior application, Serial No. 203,146, filed December 28, 1950.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 2:
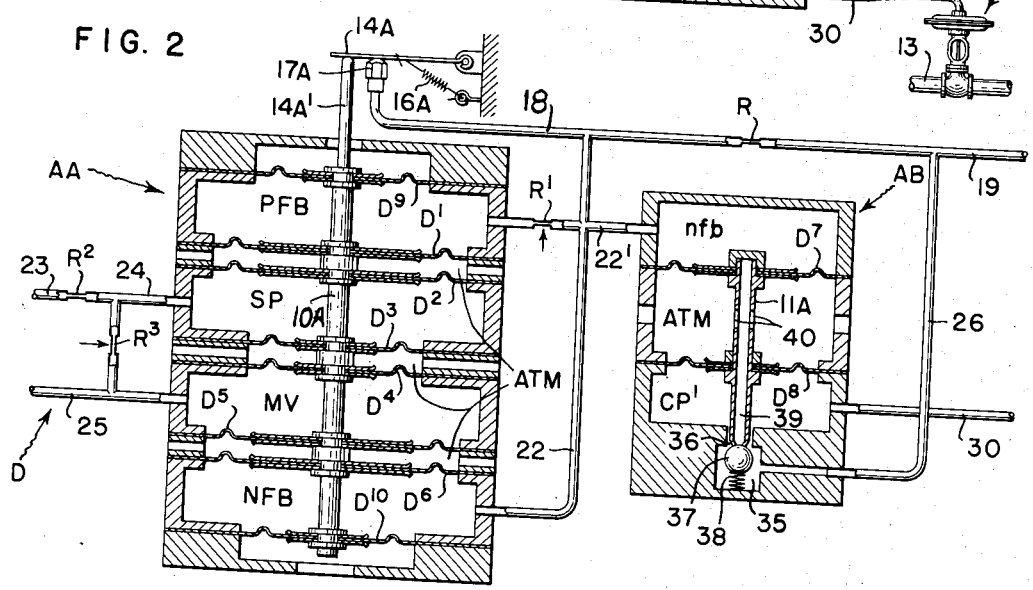

Of the drawings:

Fig. 1 is a diagrammatic sectional elevation of a preferred form of the invention; and Fig. 2 is a diagrammatic sectional elevation illustrating a modified form of the invention.

The body portion of the controller A shown in Fig. 1 is a stack assembly of rigid chambered circular elements 1, 2, 3, 4, 5, 6, 7, 8 and 9, extending in the order named from the top to the bottom of the stack assembly when the latter occupies the position shown in Fig. 1. The controller A need not be upright as shown in Fig. 1, however, as it will operate in any position in which it may be maintained. Flexible diaphragms D', $D^2$, $D^3$, $D^4$, $D^5$, $D^6$, $D^7$ and $D^8$ serve as the bottom walls of chambers formed in the sections 1, 2, 3, 4, 5, 6, 7, and 8, respectively. Each of the diaphragms $D^2$, $D^4$, and $D^6$ forms the bottom wall of a chamber ATM which is in free communication with the atmosphere. The chambers respectively above the diaphragms D', $D^3$, $D^5$, $D^7$, and $D^8$, are designated PFB, SP, MV, NFB, and CP, respectively, and each contains air under pressure which varies in accordance with variations in operating conditions. Because of the purposes which they serve, the chambers PFB and NFB are commonly referred to as positive feed-back and negative feed-back pressure chambers, respectively, and the chambers SP, MV and CP are commonly referred to as set-point, measured variable and control pressure chambers, respectively.

As shown in Fig. 1, the diameters of the central movable portions of the diaphragms D', $D^3$, $D^4$, and $D^6$ are alike, and are smaller than the diameters of the central movable portions of the diaphragms $D^2$, $D^5$, and $D^7$. The diameter of the central movable portion of the diaphragm $D^8$ of Fig. 1 is smaller than the diameters of the central movable portions of the diaphragms $D^2$, $D^5$, and $D^7$, and is larger than the diameter of the central movable portion of each of the diaphragms D', $D^3$, $D^4$, and $D^6$. As shown, each of the diaphragms is of the conventional "slack" diaphragm type or form, comprising an outer annular portion clamped between adjacent stack sections, a rigid re-enforced central portion and a flexible, curved, intermediate annular portion.

A shaft or bar 10 transverse to and extending axially through the rigid central portions of the diaphragms D', $D^2$, $D^3$, $D^4$, $D^5$, and $D^6$, is rigidly attached to each of said central portions, and is longitudinally movable in response to the changes in the resultant of the air pressures acting on said diaphragms. Similarly, a shaft or bar 11 extends axially through the rigid central portions of the diaphragms $D^7$ and $D^8$ and is rigidly attached to each of said diaphragms. The portion of the controller A including the diaphragms D', $D^2$, $D^3$, $D^4$, $D^5$ and $D^6$ connected to the shaft 10, and associated conduit and flow restricting elements hereinafter described, serves as a deviation or controlling section or portion B. The portion of the controller A including the diaphragms $D^7$ and $D^8$ and the conduit connections to the chamber CP, constitutes a pilot valve or relay section or portion C of the controller. Hereinafter described flow restrictions $R^2$ and $R^3$ and conduits associated with the chambers SP and MV, constitute a proportional band adjustment circuit or section D.

The negative feed back pressure chamber NFB with its two flexible diaphragm walls forms an operating connection between sections B and C through which the deviation section B regulates the control pressure which the section C applies to the ultimate control element, shown diagrammatically by way of example in Fig. 1, as a diaphragm motor valve 12 regulating flow through a conduit 13.

As shown, the pressures in the chambers NFB and PFB are subject to regulation by a so-called bleed or flapper valve 14, the operation of which is primarily dependent on the action of the proportional band circuit section D. The flapper valve 14 is mounted to turn about a pivot 15, and is biased by a spring 16 for turning movement in the clockwise direction, as seen in Fig. 1, into a position in which it closes the bleed orifice in a bleed nozzle 17. Normally a projection 14' carried by the shaft or bar 10 holds the valve 14 out of the position in which it totally prevents flow through nozzle 17. The nozzle 17 receives air through a branch pipe 18 connected by a flow restriction R to a pipe 19. The latter receives clean air at a predetermined, constant pressure through an air filter 20 from a supply pipe 21. The pipe 18 is connected by a conduit 22 to the negative feed-back chamber NFB, and is connected to the positive feed-back chamber PFB through an adjustable flow or "reset" restriction R'.

The practical effect of the spring bias action on the flapper valve 14, is to hold the latter in continuous engagement with the projection 14' carried by the shaft 10. The valve 14 is turned counter-clockwise or permitted to turn clock-wise about the pivot 15 on each longitudinal displacement of the shaft 10 with its projection 14, upward or downward from a position previously occupied by the shaft. The adjustment of the flapper valve 14 thus regulates the bleed nozzle pressure, i. e., the pressure in the nozzle 17 and conduit 18. That pressure is immediately increased or decreased by turning movement of the valve 14 in the clockwise or counter-clockwise direction, respectively. Each change in the bleed nozzle pressure immediately produces a corresponding change in the negative follow-up pressure in the chamber NFB, and thus tends to move the shaft 10 back towards its said previously occupied position.

Normally, the full effects of a change in the position of the flapper valve 14, and in resultant change in the bleed nozzle pressure, are delayed by the action of the bleed nozzle flow restriction R'. Each change in the bleed nozzle pressure tends to produce a slow positive follow-up, or "reset," change in the positive feed-back pressure chamber PFB. The rate at which that pressure change is effected is increased or decreased by an adjustment of the regulable flow restriction R' which increases or decreases the effective flow capacity of the restriction. In practice, each of the regulable restrictions R' and R³ may well be of the known type including a needle valve which is adjusted to vary the flow capacity of the restriction.

The changes in the position of the valve 14 result directly from changes in the longitudinal position of the shaft 10 caused by variations in the resultant of the pressures in the controller chambers PFB, SP, MV and NFB. In normal operation, the variations in the pressures in the chambers NFB and PFB are follow-up actions tending respectively to reduce and augment the movement of the shaft 10 produced by a given change in the bleed nozzle pressure effected by an angular adjustment of the valve 14.

In the normal operation of the controller A, the pressure in the negative feed-back chamber NFB depends primarily on the extent to which the outflow orifice in the bleed nozzle 17 is throttled by the valve 14. As has been explained, the angular position of the flapper valve 14 depends directly upon the position of the projection 14', and hence upon the longitudinal position of the shaft 10 which is controlled by the resultant of the pressure forces acting on the diaphragms D', D², D³, D⁴, D⁵ and D⁶. Each such pressure force is necessarily dependent both upon the area of the corresponding diaphragm, and upon the fluid pressure acting upon each unit of area of the diaphragm.

Changes in the longitudinal position of the shaft 10 result directly from changes in the pressures in the set-point and measured variable chambers SP and MV. The magnitude of the effect of a change in the pressure in the chamber SP shown in Fig. 1, on the longitudinal position of the shaft 10, is proportional to the difference between the cross sectional areas of the diaphragms D² and D³. Similarly, the magnitude of the effect of a change in the pressure in the chamber MV on the longitudinal position of the shaft 10, is proportional to the difference in the cross sectional areas of the diaphragms D⁴ and D⁵.

The pressure maintained in the measured variable chamber MV, is the pressure transmitted to that chamber by the pipe 25 and is proportional to the value of the measured variable. The latter may be, for example, the pressure of the fluid flowing in the conduit 13, or it may be the differential of pressures determining the fluid rate of flow through the conduit 13, or it may be a quantity which is wholly independent of the flow or pressure in the conduit 13.

The pressure in the chamber SP depends primarily on the predetermined set-point pressure in the conduit 23 established by a conventional bleed type pressure regulator PR, the detailed construction of which is well known in the art and comprises no part of the present invention. The regulator PR maintains a constant adjustable pressure in the conduit 23 regardless of the direction of fluid flow through restriction R², thereby to maintain the set point and proportional band adjustment independent of each other. That pressure may be a constant pressure, which may or may not be subject to periodical manual adjustments. Alternatively, the pressure in the conduit 23 may be a pressure regulated or controlled by a transmitting device responsive to variations in some quantity which controls or is related in some manner to the process controlled by the controller A.

The invention is characterized by the novel manner in which proportional band adjustments are obtained in a force balance controller providing proportional plus reset control. More specifically, the invention is characterized by the use of the simple pressure dividing means comprising the conduits 23, 24 and 25 and the flow restrictions R² and R³ of the controller section D, and operating to reduce the deviation between the set-point and measured variable pressures impressed upon the controller A. The controller A shown in Fig. 1 has a "fixed" band or throttling range which may be defined in terms of the change in the output pressure of the pilot valve section of the apparatus resulting from a given change in the input measured variable or process pressure transmitted to the chamber MV by the conduit 25, under the condition in which the fixed restriction R² is omitted and the restriction R³ is adjusted into its fully closed position so as to prevent flow between the conduits 24 and 25. This relation between the changes in pilot valve output pressure for any given change in the process input or measured variable pressure, is determined, inter alia, by the relative areas of the different diaphragms.

The actual proportional band unit shown in Fig. 1, may be expressed, assuming linear flow relations, by the following expression:

$$\frac{r^3 + r^2}{r^3} fb$$

when $fb$ represents the "fixed" band of the deviation section, and when $r^3$ and $r^2$ represent suitably proportioned values of the resistances to flow through the restrictive passages R³ and R². By suitable adjustments of the regulable restriction R³, the proportional band may be varied from the "fixed" band of the deviation section, to infinity. The controller arrangement shown is thus particularly well adapted for use in applications in which there is a need for a wide band controller.

It is to be noted that an additional beneficial feature of the controller resulting from the location of the fixed restriction R² in the set-point pressure supply line 23, is a time delay in the response of the pressure in the chamber SP to sudden changes in the process variable signal or measured variable pressure transmitted to the chamber MV. This results in an immediate "fixed" band response, determined by the quantity $fb$, in the controlled output pressure. The transient response in the pressure developed in the chamber SP to changes in the measured variable pressure result in a broadening of the controller proportional band until the latter approaches the value $$\frac{r^3+r^2}{r_3}fb$$

In applications in which a broad band controller is required for stabilized control, the feature of an instantaneous narrow band response to sudden changes in the measured variable obtainable as above described, may be particularly useful when immediate corrections for load up-sets are needed in flow systems having little storage capacity.

The type of pilot valve mechanism shown in Fig. 1 is adapted for use as a highly sensitive gain relay, or pressure multiplier, with high output capacity. With said mechanism, the pressure in the chamber CP is substantially greater than the pressure in the negative feed-back chamber NFB. Thus, in the balanced condition of the pilot valve or relay, the pressure in the chamber NFB acting on the upper side of the diaphragm $D^7$ is balanced by a pressure in the chamber CP which necessarily is substantially higher than the pressure in the chamber NFB in consequence of the fact that the pressure in the chamber CP acting upwardly against the under side of the diaphragm $D^7$, also acts downwardly on the upper side of the smaller diaphragm $D^8$. The diaphragm $D^8$ is connected to the diaphragm $D^7$ by the rod or shaft 11, and has its under side exposed to the pressure. The extent to which the pressure in the chamber NFB must exceed the pressure in the chamber CP when the pilot valve is balanced, depends upon the relative areas of the diaphragms $D^7$ and $D^8$ and increases as the area of the diaphragm $D^8$ increases relative to the area of the diaphragm $D^7$.

The described pilot valve arrangement thus permits a relatively large pressure multiplying effect to be obtained, with a relatively simple and cheap construction which requires the use of no bias spring, such as the bias spring of the pilot or relay valve section AB shown in Fig. 2 and hereinafter described.

In the operation of the pilot valve or relay mechanism shown in Fig. 1, an increase in the pressure admitted to the input chamber, (i. e., NFB) results in a downward motion of the rod 11. That motion may continue until the rigid central portion of the diaphragm $D^8$ seats on and closes the exhaust nozzle 28. Air will then flow without restriction through the supply nozzle 27 and the pressure will build up in the output chamber CP until a balanced condition is established. When that condition is established, the diaphragm $D^8$ will occupy an intermediate position between the supply nozzle 27 and exhaust nozzle 28, so that the relative amounts of restriction introduced into the supply and exhaust lines connected to the chamber CP is sufficient to stabilize the output pressure. Air will then flow at a constant rate into the chamber CP through the inlet nozzle 27, and out of that space through the passage 29 and exhaust nozzle 28. On an increase or decrease in the pressure in the chamber NFB, the diaphragm $D^8$ will move respectively toward or away from the exhaust nozzle 28 and away from or toward the supply nozzle 27 and from the exhaust nozzle 28 and thereby vary the pressure in the chamber CP until the resultant of the forces due to that pressure acting upward on the larger diaphragm $D^7$ and downward on the smaller diaphragm $D^8$, balances the downward thrust on the diaphragm $D^7$ of the pressure in the chamber NFB.

While Fig. 1 illustrates the form of embodiment of the invention which I now prefer, the general advantages of the invention may be obtained with apparatus of different forms. One alternative form of the apparatus is shown by way of example in Fig. 2. In Fig. 2, the deviation and pilot valve or relay section of the apparatus are included in separate structural elements AA and AB. The element AA includes the pressure chambers PFB, SP, MV and NFB and associated chambers open to the atmosphere. The element AB comprises an upper chamber $nfb$, a lower control pressure chamber CP' and an intermediate chamber open to the atmosphere. The deviation unit or section AA differs in form from the corresponding portion of the structure A shown in Fig. 1, in having additional diaphragms $D^9$ and $D^{10}$ connected to the shaft 10A. The diaphragm $D^9$ forms the top wall of the positive feed-back chamber PFB of Fig. 2, and has its upper side exposed to atmospheric pressure, and is suitably smaller in diameter than the diaphragm D' forming the lower end wall of the chamber PFB. In Fig. 2 the cross sectional area of the diaphragm D' is relatively greater than it is in Fig. 1, to compensate for the opposing action of the diaphragm $D^9$. The diaphragm $D^{10}$ forms the bottom wall of the chamber NFB, and has its under side open to the atmosphere and is suitably smaller than the diaphragm $D^6$ which forms the top wall of the chamber NFB.

In Fig. 2, the flapper valve of Fig. 1 is replaced by an operatively similar valve 14A, which with the associated bias spring 16A and bleed nozzle 17A, are external to the chambered structure AA. To adjust the flapper valve 14A, the shaft 10A connected to the diaphragms in the structure AA, is provided with an extension 14A' at its upper end. That extension raises and lowers the free end of the flapper valve 14A as the resultant of the pressures acting on the diaphragms connected to the shaft 10A moves the latter up and down, respectively.

The apparatus included in the section AA of Fig. 2 operates in the same general manner as does the corresponding portion of the apparatus shown in Fig. 1. In Fig. 2, the clean, constant pressure air supplied by the pipe 19, passes through the restriction R to the pipe 18, and thence to the bleed nozzle 17A, and passes through the branch pipe 22 directly to the chamber NFB, and passes from the pipe 22 through the adjustable reset restriction R' to the chamber PFB and through the branch pipe 22 to the chamber $nfb$, and as shown does not differ from the corresponding circuit of Fig. 1. In the section AB of Fig. 2, the pressure in the upper end chamber $nfb$ is equal to the pressure in the chamber NFB, since chamber $nfb$ is in free communication with the conduit 22 through its branch 22'.

In Fig. 2, the chamber CP' has an upper wall formed by the diaphragm $D^8$ and a bottom wall formed by the lower end portion of the chambered structure AB. The diaphragms $D^7$ and $D^8$ are connected by a hollow rod or shaft 11A. The lower end of the hollow shaft or rod 11A is shaped to form a valve seat which is closed by a ball valve 37 when the pressure in the chamber CP' is relatively low. The ball valve 37 is movable in a chamber 35 formed in the bottom wall of the structure AB. The chamber 35 has an upper outlet 36 which opens into the chamber CP', and is smaller in diameter than the valve 37, and is larger in diameter than the portion of the hollow shaft 11A which enters said passage.

On an increase in the pressure in the chamber CP' relative to the pressure in the chamber $nfb$, the shaft 11A is given an upward movement. During an initial upward movement of the shaft 11A, the valve 37 is held in contact with its seat at the lower end of the hollow shaft 11A by a bias spring 38. The upward movement of the valve 37 is arrested, however, when the valve engages the lower end of the wall surrounding the passage 36. On further upward movement, the member 11A separates from the valve 37, and thereby permits air to escape from the chamber CP' through the passage 39 which then has its lower end open, and which has lateral ports 40 opening to the chamber ATM between the diaphragms $D^7$ and $D^8$, and thence into the atmosphere. The outflow of air through the channel 39 reduces the pressure in the chamber CP' as required to return the apparatus to the condition in which the ball valve 37 seats against the lower end of the hollow shaft 11A and thus interrupts the escape of air to the atmosphere from the control pressure chamber CP'.

As shown in Fig. 2, the chamber CP' receives air from the pipe 19 through the pipe 26. The pressure maintained in the control pressure chamber CP' is transmitted by the pipe 30 to the ultimate control element. The latter may or may not be a fluid pressure motor valve like the valve 12 of Fig. 1. While the pilot valve mechanism shown in Fig. 2 differs in some respects from the pilot valve mechanism shown in Fig. 1, the two mechanisms are alike in that the diaphragm $D^8$ may be and as shown, is smaller in area than the diaphragm $D^7$. In consequence, the pressure in the chamber CP' of Fig. 2, like the pressure in the chamber CP of Fig. 1, normally exceeds the pressure in the associated negative feed-back chamber NFB. Thus the pilot valve mechanism shown in each of the figures constitutes a highly sensitive gain relay or pressure multiplier with high capacity at its output.

Practical considerations may limit the lowest proportional band usable with the present invention to form ten to twenty percent in some cases, though in other cases the band range may be as low as, or lower than five percent. While proportional bands as narrow as or narrower than five percent are desirable in some cases, for most commercial uses to which a controller of the general character disclosed is employed, a throttling band having its lower value not greater than about twenty percent is practically satisfactory.

It is to be noted that it is practically possible to locate the fixed restriction $R^2$ either in the set-point conduit portion or in the measured variable, conduit portion of the pressure dividing circuit D. However, the location of the restriction in the set-point conduit portion as shown in Figs. 1 and 2, may be helpful in over-coming the effect of time delays present in other parts of circuit. With the restriction $R^2$ so located, the over-shoot period which may develop can be minimized by reducing the volume of the set-point chamber SP.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A controller of the air controller type providing proportional control and comprising in combination, a structure, deviation means supported by said structure and comprising set-point, measured variable, and negative feed-back responsive devices, each of said devices comprising a pressure chamber having at least one flexible wall parallel to a flexible wall of each of the other devices, a control element perpendicular to and operatively connected to a central portion of each of said flexible walls, said flexible walls and control element being so relatively arranged that the measured variable device tends to move said element in one direction and that the negative feed-back and set-point devices each tend to move said element in a direction opposite to the first mentioned direction, conduit means for impressing a set-point force on the set-point device, a first flow restricting device connected between said conduit means and said set-point device, means to maintain in said conduit means a predetermined constant pressure regardless of the direction of fluid flow through said first flow restricting device, a second conduit means for impressing a force on said measured variable device which varies in accordance with changes in a controlling condition, a second flow restricting means connecting said measured variable and set-point chambers, one of said flow restricting devices being adjustable to vary its flow capacity, a conduit comprised of a hollow tube having imperforate walls connected to one end of said first flow restricting device and to one end of said second flow restricting device and to said set-point device, said imperforate conduit walls being sealed to prevent the escape of air therefrom except through said first and said second flow restricting devices, and a control device actuated by said element to produce control effects on and in accordance with the movements of said elements.

2. A controller as specified in claim 1, which includes a pilot valve mechanism operative to produce a control pressure larger per unit of area than the controller negative feed-back pressure and comprising a movable structure including separate surface portions to which said pressures are separately applied, said negative feed-back pressure being effectively applied to one surface of a relatively large portion of said structure and tending to move the latter in one direction and said control pressure being effectively applied to the opposite surface of said relatively large portion and to one surface of a smaller portion to oppose and balance said tendency.

References Cited in the file of this patent

UNITED STATES PATENTS

| | | |
|---|---|---|
| 2,117,800 | Harrison | May 17, 1938 |
| 2,286,282 | Joesting | June 16, 1942 |
| 2,304,782 | Donaldson | Dec. 15, 1942 |
| 2,356,970 | Brockett | Aug. 29, 1944 |
| 2,431,297 | Moore | Nov. 18, 1947 |
| 2,505,981 | McLeod | May 2, 1950 |
| 2,514,445 | Eckman | July 11, 1950 |
| 2,517,051 | Swenson | Aug. 1, 1950 |
| 2,556,436 | Moore | June 12, 1951 |
| 2,588,678 | Willis | Mar. 11, 1952 |
| 2,589,251 | Heinz | Mar. 18, 1952 |